United States Patent
Varma

(10) Patent No.: US 9,961,556 B2
(45) Date of Patent: *May 1, 2018

(54) PROTOCOL FOR ALLOCATING UPSTREAM SLOTS OVER A LINK IN A POINT-TO-MULTIPOINT COMMUNICATION SYSTEM

(71) Applicant: Wi-LAN, Inc., Ottawa (CA)

(72) Inventor: Subir Varma, San Jose, CA (US)

(73) Assignee: WIRELESS PROTOCOL INNOVATIONS, INC., Marshall, TX (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/805,051

(22) Filed: Jul. 21, 2015

(65) Prior Publication Data

US 2015/0358965 A1 Dec. 10, 2015

Related U.S. Application Data

(63) Continuation of application No. 14/078,246, filed on Nov. 12, 2013, now Pat. No. 8,154,961, which is a (Continued)

(51) Int. Cl.
*H04W 72/14* (2009.01)
*H04W 16/04* (2009.01)
(Continued)

(52) U.S. Cl.
CPC .............. *H04W 16/04* (2013.01); *H04L 12/18* (2013.01); *H04W 72/0446* (2013.01);
(Continued)

(58) Field of Classification Search
CPC .... H04L 12/413; H04L 47/762; H04W 74/04; H04W 72/12; H04W 74/0808;
(Continued)

(56) References Cited

U.S. PATENT DOCUMENTS 3,663,762 A 5/1972 Joel, Jr.
4,688,210 A 8/1987 Eizenhofer et al.
(Continued)

FOREIGN PATENT DOCUMENTS

EP 1037405 A2 9/2000
JP H6-237214 8/1994
(Continued)

OTHER PUBLICATIONS

Quigley. "Cablemodem Standards for Advanced Quality of Service Deployments." http://www.broadband.gatech.edu/events/past/resident/DOCSIS1.pdf, Mar. 1999.
(Continued)

*Primary Examiner* — Mohamed Kamara
(74) *Attorney, Agent, or Firm* — Procopio, Cory, Hargreaves & Savitch LLC

(57) ABSTRACT

A system for controlling a contention state for a communication link between a base station controller and customer premises equipment in point-to-multipoint communication. The contention state is controlled using a state machine, which includes a grant pending absent state in which a unicast request slot is maintained open for use by the customer premises equipment. During the grant pending absent state, the customer premises equipment sends no upstream data to the base station controller but can use the unicast request slot to request a data slot for sending upstream data to the base station controller. In the grant pending state, the customer premises equipment preferably uses piggybacking to request grant of a next data slot while sending upstream data to the base station controller.

23 Claims, 2 Drawing Sheets

Related U.S. Application Data continuation of application No. 14/059,220, filed on Oct. 21, 2013, now Pat. No. 9,125,051, which is a continuation of application No. 13/360,334, filed on Jan. 27, 2012, now Pat. No. 8,565,256, which is a continuation of application No. 11/703,065, filed on Feb. 6, 2007, now Pat. No. 8,274,991, which is a continuation of application No. 09/689,243, filed on Oct. 11, 2000, now Pat. No. 7,173,921.

(51) Int. Cl.

| | | |
|---|---|---|
| *H04L 12/18* | (2006.01) | |
| *H04W 72/04* | (2009.01) | |
| *H04W 72/12* | (2009.01) | |
| *H04W 74/02* | (2009.01) | |
| *H04J 3/16* | (2006.01) | |
| *H04W 28/04* | (2009.01) | |
| *H04W 74/06* | (2009.01) | |
| *H04W 74/08* | (2009.01) | |

(52) U.S. Cl.
CPC ....... *H04W 72/1284* (2013.01); *H04W 72/14* (2013.01); *H04W 74/02* (2013.01); *H04J 3/1694* (2013.01); *H04W 28/04* (2013.01); *H04W 72/0413* (2013.01); *H04W 74/06* (2013.01); *H04W 74/0833* (2013.01)

(58) Field of Classification Search
CPC ........ H04W 74/08; G05B 2219/31187; G05B 2219/31188; G05B 2219/25226
USPC .... 370/252, 277, 310.2, 328–330, 338, 341, 370/431, 445, 447, 450, 458–459, 370/461–462; 455/450, 451, 452.1, 464
See application file for complete search history.

(56) References Cited

U.S. PATENT DOCUMENTS

| | | | |
|---|---|---|---|
| 4,754,453 A | 6/1988 | Eizenhofer | |
| 4,763,322 A | 8/1988 | Eizenhofer | |
| 4,799,252 A | 1/1989 | Eizenhoffer et al. | |
| 5,499,243 A | 3/1996 | Hall | |
| 5,559,790 A | 9/1996 | Yano et al. | |
| 5,560,021 A | 9/1996 | Vook et al. | |
| 5,563,883 A | 10/1996 | Cheng | |
| 5,648,958 A | 7/1997 | Counterman | |
| 5,657,325 A | 8/1997 | Lou et al. | |
| 5,673,031 A | 9/1997 | Meier | |
| 5,717,713 A | 2/1998 | Natali | |
| 5,751,708 A | 5/1998 | Eng et al. | |
| 5,764,630 A | 6/1998 | Natali et al. | |
| 5,809,015 A | 9/1998 | Elliott et al. | |
| 5,818,828 A | 10/1998 | Packer et al. | |
| 5,940,399 A | 8/1999 | Weizman | |
| 5,956,338 A | 9/1999 | Ghaibeh | |
| 5,966,377 A | 10/1999 | Murai | |
| 6,006,017 A | 12/1999 | Joshi et al. | |
| 6,018,528 A | 1/2000 | Gitlin et al. | |
| 6,115,390 A * | 9/2000 | Chuah .................. | H04L 1/1607 370/348 |
| 6,128,322 A | 10/2000 | Rasanen et al. | |
| 6,192,026 B1 | 2/2001 | Pollack et al. | |
| 6,269,088 B1 | 7/2001 | Masui et al. | |
| 6,381,211 B1 | 4/2002 | Lysejko et al. | |
| 6,466,544 B1 | 10/2002 | Sen et al. | |
| 6,529,520 B1* | 3/2003 | Lee ..................... | H04L 12/5602 370/442 |
| 6,594,240 B1 | 7/2003 | Chuah et al. | |
| 6,594,251 B1 | 7/2003 | Raissinia et al. | |
| 6,650,624 B1 | 11/2003 | Quigley et al. | |
| 6,665,307 B1 | 12/2003 | Rydnell et al. | |
| 6,680,929 B1 | 1/2004 | Iida et al. | |
| 6,785,252 B1 | 8/2004 | Zimmerman et al. | |
| 6,785,291 B1 | 8/2004 | Cao et al. | |
| 6,801,513 B1 | 10/2004 | Gibbons et al. | |
| 6,804,251 B1* | 10/2004 | Limb ..................... | H04L 12/66 370/444 |
| 6,834,057 B1 | 12/2004 | Rabenko et al. | |
| 6,847,635 B1 | 1/2005 | Beser | |
| 6,850,504 B1 | 2/2005 | Cao et al. | |
| 6,909,715 B1 | 6/2005 | Denney et al. | |
| 6,950,399 B1 | 9/2005 | Bushmitch et al. | |
| 7,024,469 B1* | 4/2006 | Chang ................ | H04Q 11/0478 370/346 |
| 7,170,904 B1* | 1/2007 | Chang ................. | H04L 12/5601 370/329 |
| 7,173,921 B1 | 2/2007 | Varma | |
| 7,468,972 B2* | 12/2008 | Walsh ................ | H04B 7/18584 370/329 |
| 7,856,497 B2 | 12/2010 | McKinnon, III et al. | |
| 8,254,394 B1 | 8/2012 | Gummalla | |
| 8,274,991 B2 | 9/2012 | Varma | |
| 8,565,256 B2 | 10/2013 | Varma | |
| 9,125,051 B2 | 9/2015 | Varma | |

FOREIGN PATENT DOCUMENTS

| | | |
|---|---|---|
| JP | H7-336767 | 12/1995 |
| WO | 93/15573 | 8/1993 |
| WO | 95/03652 | 2/1995 |
| WO | 96/38934 | 12/1996 |
| WO | 97/17768 A1 | 5/1997 |
| WO | 98/59523 A2 | 12/1998 |
| WO | 99/01959 A2 | 1/1999 |
| WO | 99/14975 A2 | 3/1999 |
| WO | 99/23844 A2 | 5/1999 |
| WO | 99/44341 A1 | 9/1999 |
| WO | 1999061993 A1 | 12/1999 |
| WO | 01/50633 A1 | 7/2001 |
| WO | 01/50669 A1 | 7/2001 |

OTHER PUBLICATIONS

Civanlar et al. "Self-Healing in Wideband Packet Networks." IEEE Network, Jan. 1990, pp. 35-39, vol. 4., No. 1, IEEE, New York, US.

United States District Court, Souther District of Florida. *Wi-LAN USA, Inc. and Wi-Lan Inc.*, Plaintiffs, v. *Research in Motion Limited and Research in Motion Corporation*, Defendant. "Complaint." Entered May 8, 2013. Case No. 1:13-cv-21662-DMM. 11 pages.

"Baseline Privacy Interface Specification", Data-Over-Cable Service Interface Specifications, SP-BPI-I01-970922, Sep. 22, 1997.

Lin et al. "An Investigation Into HFC MAC Protocols: Mechanisms, Implementation, and Research Issues"; IEEE Communications Surveys, Third Quarter; 2000.

TCT Mobile (US) Inc. and TCT Mobile, Inc.'s Invalidity Contentions and Production of Documents Pursuant to P.R. 3-3 and 3-4. In the United States District Court for the Eastern District of Texas, Tyler Division. *Wireless Protocol Innovations, Inc.*, v. *TCT Mobile (US) Inc., et al.* Case No. 6:15-cv-00918-KNM. May 25, 2016.

*TCT Mobile (US) Inc. & TCT Mobile, Inc.* v. *Wireless Protocol Innovations, Inc.* Petition for Inter Partes Review of Claims 1 & 3-5 of U.S. Pat. No. 8,274,991 under 35 U.S.C. §§311-319 and 37 C.F.R. §42.100 et seq. Jul. 27, 2016. (Exhibits listed separately. Excluding duplicative references).

Excerpts from IEEE Standard Electronics Dictionary (1996).

Excerpts from Newton's Telecom Dictionary (1999).

Chet Shirali (Phasecom Inc.), "MAC document based on DOCSIS 1.1 (SP-RFv1.1-I02-990731)," IEEE 802.16 Broadband Wireless Access ("BWA") Working Group ("WG") Document No. IEEE 802.16mc-99/03 (Sep. 10, 1999).

Glen Sater et al. (Motorola), "Media Access Control Protocol Based on DOCSIS 1.1," IEEE 802.16 Broadband Wireless Access ("BWA") Working Group ("WG") Document No. IEEE 802.16mc-99/16 (Oct. 29, 1999)

Arun Aruncahalam et al. (Nortel Networks), "DOCSIS based MAC layer proposal for BWA", IEEE 802.16 BWA WG Document No. IEEE 802.16mc-99/04 (Oct. 21, 1999).

(56) References Cited

OTHER PUBLICATIONS

Phil Guillemette et al. (SpaceBridge Networks Corp.), "MAC Protocol Proposal for Fixed BWA Networks Based on DOCSIS", IEEE 802.16 BWA WG Document No. IEEE 802.16mc-99/13 (Oct. 29, 1999)

"[Approved] Minutes of 802.16 Session #8 [(July 10-13, 2000)]", IEEE 802.16 BWA WG Document No. IEEE 802.16-00/17r1 (Aug. 13, 2000)

Glen Sater et al., "Media Access Control Layer Proposal for the 80216.1 Air Interface Specification", IEEE 802.16 BWA WG Document No. IEEE 802.16.1 mc-00/21r1 (Jul. 7, 2000)

David Steer et at., "Radio System Design for Broadband Residential Access", Proceedings of IEEE Radio and Wireles Conference ("RAWCON") 31-34 (1999)

Aperto Networks Press Release, "Aperto Networks Enters MultiService Broadband Wireless Access Market" (Jul. 10, 2000).

Aperto Networks Press Release, "Apeno Networks Serves in Lead Roles for IEEE 802.16 Fixed Broadband Wireless Access Standards Development" (Nov. 20, 2000).

John Markoff, "Cisco to Offer More Details on Wireless Technology," New York Times (Nov. 29, 1999).

Fred Dawson, "Cisco, Broadcom Wireless Gear Boost MCI, Sprint MMDS Plans", Broadband Week (Nov. 1, 1999)

Glen Sater et al., "Media Access Control Protocol Based on DOCSIS 1.1", IEEE 802.16 Broadband Wireless Access ("BWA") Working Group ("WG") Document No. IEEE 802.16.1mp-00/01 (Dec. 23, 1999).

Glen Sater et al., "80216.1 MAC Proposal", IEEE 802.16 Broadband Wireless Access ("BWA") Working Group ("WG") Document No. IEEE 802.16.1mp-00/09 (Mar. 7, 2000).

Excerpt of SEC Form S-1/A, VYYO Inc. (Apr. 3, 2000)

*TCT Mobile (US) Inc. & TCT Mobile, Inc.* v. *Wireless Protocol Innovations, Inc.* Petition for Inter Partes Review of Claims 1, 2, 4-5, 21, 22-23 & 25-26 of U.S. Appl. No. 9,125,051 under 35 U.S.C. §§ 311-319 and 37 C.F.R. § 42.100 et seq. Sep. 20, 2016 (Exhibits listed separately. Excluding duplicative references).

*TCT Mobile (US) Inc. & TCT Mobile, Inc.* v. *Wireless Protocol Innovations, Inc.* Petition for Inter Partes Review of Claims 6,7, 9-10, 11, 12, 14-15, 16 & 17-19 of U.S. Appl. No. 9,125,051 under 35 U.S.C. §§ 311-319 and 37 C.F.R. § 42.100 et seq. Sep. 20, 2016 (Exhibits listed separately. Excluding duplicative references).

Declaration of Stuart J. Lipoff in support of Petitions for Inter Partes Review of Claims 1, 2, 4-5, 6, 7, 9-10, 11, 12, 14-15, 16, 17-19, 21, 22-23 & 25-26 of U.S. Appl. No. 9,125,051, dated Sep. 20, 2016.

Recorded Assignments for the '051 Patent.

Excerpts of Prosecution History of the '051 Patent.

James F. Mollenauer, "Functional Requirements for Broadband Wireless Access Networks," IEEE 802 Broadband Wireless Access Study Group (Mar. 5, 1999).

Additional Excerpt of Newton's Telecom Dictionary 1999 at 220-221 ("Customer Premises Equipment").

Declaration of Stuart J. Lipoff in Support of Petition for Inter Partes Review of Claims 1, 4 & 7 of U.S. Appl. No. 8,565,256, dated Aug. 31, 2016.

Data-Over-Cable Service Interface Specifications ("DOCSIS"), Radio Frequency Interface ("RFI") Specification, Second Interim Release, Document Control No. SP-RFIv1.1-I02-990731 ("DOCSIS 1.1"). Jul. 31, 1999.

Data-Over-Cable Service Interface Specifications ("DOCSIS"), Radio Frequency Interface ("RFI") Specification, Document Control. No. SP-RFI-I02-971008 ("DOCSIS 1.0"). Oct. 8, 1997.

Declaration of Stuart J. Lipoff in Support of Petition for Inter Partes Review of Claims 1 & 3-5 of U.S. Appl. No. 8,274,991, dated Jul. 27, 2016.

Chih-Lin I et al. "Multi-code CDMA wireless personal communications networks". Communications, 1995. ICC '95 Seattle, 'Gateway to Globalization', 1995 IEEE International Conference on, Seattle, WA, 1995, pp. 1060-1064 vol.2.

Chih-Lin I et al. "Variable Spreading Gain CDMA with Adaptive Control for True Packet Switching Wireless Network" Communications, 1995. ICC '95 Seattle, 'Gateway to Globalization', 1995. IEEE International Conference on, Seattle, WA, 1995, pp. 725-730 vol.2.

Goldsmith et al. "Capacity of Broadcast Fading Channels with Variable Rate and Power". Global Telecommunications Conference, 1996. GLOBECOM '96. Communications: The Key to Global Prosperity, London, 1996, pp. 92-96.

TIA/EIA Interim Standard titled "Mobile Station-Base Station Compatibility Standard for Dual-Mode Wideband Spread Spectrum Cellular System" ("IS-95-A"). May 1995.

TIA/EIA Interim Standard-95 Mobile Station-Base Station Compatibility Standard for Dual-Mode Wideband Spread Spectrum Cellular System. Jul. 1993.

TIA/EIA Interim Standard-96 Speech Service Option Standard for Wideband Spread Spectrum Digital Cellular System. Apr. 1994.

Tiedemann Jr. "CDMA for Cellular and PCS". Presented at Electro/94 lntenational Conference in 1994.

Wilson et al. "Packet CDMA versus Dynamic TDMA for Multiple Access in an Integrated Voice/Data PCN" IEEE Journal on Selected Areas in Communications, vol. 11, No. 6, pp. 870-884, Aug. 1993.

*Wireless Protocol Innovations, Inc.* v. *TCT Mobile (US) Inc., et al.* Case No. 6:15-cv-00918-KNM. TCT Mobile (US) Inc. and TCT Mobile, Inc's First Supplemental Invalidity Contentions and Production of Documents Pursuant to P.R. 3-3, 3-4, and 3-6. Jul. 8, 2016.

*Wireless Protocol Innovations, Inc.* v. *TCT Mobile (US) Inc., et al.* Case No. 6:15-cv-00918-KNM. TCT Mobile (US) Inc. and TCT Mobile, lnc.'s Second Supplemental Invalidity Contentions and Production of Documents Pursuant to P.R. 3-3 and 3-4. Jul. 25, 2016.

*Wireless Protocol Innovations, Inc.* v. *ZTE Corporation, et al.* Case No. 6:15-cv-00919-JRG-KNM. ZTE (US) Inc. and ZTE (TX), Inc.'s Invalidity Contentions and Production of Documents Pursuant to P.R. 3-3 and 3-4- Jul. 8, 2016.

Woodward et al. "CDMA Cellular Mobile System Capacity Improvement by Combination with TDMA and Adaptive Interference Suppression". Wireless Communication System Symposium, IEEE, 1995, pp. 171-177.

Wu et al. "Capacity Allocation for Integrated Voice/Data Transmission at a Packet Switched TDM". INFOCOM '89. Proceedings of the Eighth Annual Joint Conference of the IEEE Computer and Communications Societies. Technology: Emerging or Converging, IEEE, Ottawa, Ont., 1989, pp. 429-438 vol.2.

*Wireless Protocol Innovations, Inc.* v. *TCT Mobile (US) Inc., et al.* Case No. 6:15-cv-00918-KNM. TCT Mobile (US) Inc. and TCT Mobile, lnc.'s Third Supplemental Invalidity Contentions and Production of Documents Pursuant to P.R. 3-3 and 3-4. Oct. 28, 2016.

*TCT Mobile (US) Inc. & TCT Mobile, Inc.* v. *Wireless Protocol Innovations, Inc.* Petition for Inter Partes Review of Claims 1,4 & 7 of U.S. Appl. No. 8,565,256 under 35 U.S.C. §§ 311-319 OF 37 C.F.R. § 42.100 et seq. Aug. 31, 2016 (Exhibits listed seperately. Excluding duplicative references).

Declaration of Stuart J. Lipoff.

Recorded Assignments for the '256 Patent.

Excerpts from Prosecution History of the '256 Patent.

Additional Excerpt of Newton's Telecom Dictionary 1999 at 205 ("Contention").

*TCT Mobile, Inc. and TCT Mobile (US) Inc.* v. *Wireless Protocol Innovations, Inc.* Case IPR2016-01494, Patent 8,274,991 B2. Decision Instituting Inter Partes Review (35 U.S.C. § 314, 37 C.F.R. §§ 42.4, 42.108). Feb. 13, 2017.

*TCT Mobile (US) Inc. & TCT Mobile, Inc.* v. *Wireless Protocol Innovations, Inc.* Case IPR2016-01494, Patent 8,274,991 B2. Patent Owner Wireless Protocol Innovations, Inc.'s Preliminary Response under 35 U.S.C. § 313 and 37 C.F.R. § 42.107. Nov. 14, 2016. Exhibits listed separately on this PTO/SBO8.

*TCT Mobile, Inc. and TCT Mobile (US) Inc.* v. *Wireless Protocol Innovations, Inc.* Case IPR2016-01704, Patent 8,565,256 B2. Decision Instituting Inter Partes Review (35 U.S.C. § 314, 37 C.F.R. §§ 42.4, 42.108). Mar. 3, 2017.

*TCT Mobile, Inc. and TCT Mobile, Inc.* v. *Wireless Protocol Innovations, Inc.* Case IPR2016-01704, Patent 8,565,256. Patent Owner Wireless Protocol Innovations, Inc.'s Preliminary Response

(56) References Cited

OTHER PUBLICATIONS under 35 U.S.C. § 313 and 37 C.F.R. § 42.107. Dec. 8, 2016. Exhibits listed separately on this PTO/SBO8.
*TCT Mobile, Inc. and TCT Mobile (US) Inc.* v. *Wireless Protocol Innovations, Inc.* Case IPR2016-01861, Patent 9,125,051 B2. Decision Instituting Inter Partes Review (35 U.S.C. § 314, 37 C.F.R. §§ 42.4, 42.108). Mar. 24, 2017.
*TCT Mobile (US) Inc. & TCT Mobile, Inc.* v. *Wireless Protocol Innovations, Inc.* Case IPR2016-01861, Patent 9,125,051. Patent Owner Wireless Protocol Innovations, Inc.'s Preliminary Response under 35 U.S.C. § 313 and 37 C.F.R. § 42.107. Dec. 28, 2016. Exhibits listed separately on this PTO/SBO8.
*TCT Mobile, Inc. and TCT Mobile (US) Inc.* v. *Wireless Protocol Innovations, Inc.* Case IPR2016-01865, Patent 9,125,051 B2. Decision Instituting Inter Partes Review (35 U.S.C. § 314, 37 C.F.R. §§ 42.4, 42.108). Mar. 24, 2017.
*TCT Mobile (US) Inc. & TCT Mobile, Inc.* v. *Wireless Protocol Innovations, Inc.* Case IPR2016-01865, Patent 9,125,051. Patent Owner Wireless Protocol Innovations, Inc.'s Preliminary Response under 35 U.S.C. § 313 and 37 C.F.R. § 42.107. Dec. 28, 2016. Exhibits listed separately on this PTO/SBO8.
*TCT Mobile (US) Inc. & TCT Mobile, Inc.* v. *Wireless Protocol Innovations, Inc.* Case IPR2016-01494, Patent 8,274,991 82. Patent Owner Wireless Protocol Innovations, Inc.'s Response under 35 U.S.C. § 316 and 37 C.F.R. §42.220. May 15, 2017. Exhibits listed separately on this PTO/SB08.
Declaration of Gary Lomp, Ph.D. in Support of Patent Owner's Preliminary Response under 35 U.S.C. §313 and 37 C.F.R. § 42.107. Nov. 14, 2016.
Curriculum Vitae of Gary Lomp, Ph.D.
Declaration of Gary Lomp, Ph.D. in support of Patent Owner's Response under 35 U.S.C. § 316 and 37 C.F.R. § 42.220. May 15, 2017.
Excerpts from Webster's Encyclopedic Unabridged Dictionary of the English Language (1994).
Excerpts from Merriam Webster's Collegiate Dictionary (10th ed. 1996).
Amendment, filed Jun. 15, 2011, from the prosecution history of U.S. Appl. No. 8,274,991.
Amendment, filed Jul. 2, 2010, from the prosecution history of U.S. Appl. No. 8,274,991.
The Deposition of Stuart J. Lipoff (Apr. 18, 2017) and executed Deposition Errata Sheet (Apr. 30, 2017) ("Lipoff depo".).
Declaration of Gary Lomp, Ph.D. in Support of Patent Owner's Preliminary Response under 35 U.S.C. § 313 and 37 C.F.R. § 42.107. Dec. 8, 2016.
Declaration of Gary Lomp, Ph.D. in Support of Patent Owner's Preliminary Response under 35 U.S.C. § 313 and 37 C.F.R. § 42.107. Dec. 27, 2016.
Declaration of Gary Lomp, Ph.D. in Support of Patent Owner's Preliminary Response under 35 U.S.C.§ 313 and 37 C.F.R. § 42.107. Dec. 27, 2016.
Declaration of Robert H. Sloss in Support of Patent Owner Wireless Protocol Innovations, Inc.'s Motion for Admission Pro Hac Vice of Robert H. Sloss Pursuant to 37 CFR § 42.10(c). Mar. 14, 2017.
Declaration of Robert H. Sloss in Support of Patent Owner Wireless Protocol Innovations, Inc.'s Motion for Admission Pro Hac Vice of Robert H. Sloss Pursuant to 37 CFR § 42.10(c). Apr. 6, 2017.
*TCT MOBILE (US) INC. & TCT MOBILE, INC.* v. *WIRELESS PROTOCOL INNOVATIONS, INC.* Case IPR2016-01704, Patent 8,565,256 B2. Patent Owner Wireless Protocol Innovations, Inc.'s Response under 35 U.S.C. §316 and 37 C.F.R. §42.220. Jun. 5, 2017. Exhibits listed separately on this PTO/SBO8.
Declaration of Gary Lomp, Ph.D. in support of Patent Owner's Response under 35 U.S.C. § 316 and 37 C.F.R. § 42.220. Jun. 5, 2017.
*Wireless Protocol Innovations, Inc.*v. *TCT Mobile (US) Inc., et al.* Case No. 6:15-cv-00918-KNM (E.D. Tex.). "Plaintiff's Answer to TCT's Counterclaims". Nov. 21, 2016.
*Wireless Protocol Innovations, Inc.* v. *TCT Mobile (US) Inc., et al.* Case No. 6:15-cv-00918-KNM (E.D. Tex.). "First Amended Complaint". Oct. 26, 2016.
*Wireless Protocol Innovations, Inc.* v. *TCL Corporation, et al.* Case No. 6:15-cv-00918-JRG (E.D. Tex.). "Plaintiff Wireless Protocol Innovations, Inc.'s Answer to Defendants TCT Mobile (US) Inc.'s and TCT Mobile, Inc.'s Counterclaims". Feb. 8, 2016.
*Wireless Protocol Innovations, Inc.* v. *TCL Corporation, et al.* Case No- 6:15-cv-00918-JRG (E.D. Tex.). "Defendants TCT Mobile (US) Inc. and TCT Mobile, Inc.'s Answer, Defenses and Counterclaims to Plaintiff Wireless Protocol Innovations, Inc.'s Complaint". Jan. 14, 2016.
Final Written Decision entered Mar. 2, 2018, *TCT Mobile, Inc. and TCT Mobile (US) Inc.*v. *Wireless Protocol Innovations, Inc.*, Case IPR2016-01704, Patent 8,565,256 B2, before the Patent Trial and Appeal Board, United State Patent and Trademark Office, 24 pages.
Final Written Decision entered Feb. 13, 2018, *TCT Mobile, Inc. and TCT Mobile (US) Inc.*v. *Wireless Protocol Innovations, Inc.*, Case IPR2016-01494, Patent 8,274,991 B2, before the Patent Trial and Appeal Board, United State Patent and Trademark Office, 38 pages.

\* cited by examiner

PROTOCOL FOR ALLOCATING UPSTREAM SLOTS OVER A LINK IN A POINT-TO-MULTIPOINT COMMUNICATION SYSTEM

CROSS-REFERENCE TO RELATED APPLICATIONS

This application is a continuation of U.S. patent application Ser. No. 14/078,246, filed Nov. 12, 2013, in the name of Subir Varma, titled "Protocol for Allocating Upstream Slots Over a Link in a Point-to-Multipoint Communication System", which is a continuation of U.S. patent application Ser. No. 14/059,220, filed Oct. 21, 2013, in the name of Subir Varma, titled "Protocol for Allocating Upstream Slots Over a Link in a Point-to-Multipoint Communication System", which is a continuation of U.S. patent application Ser. No. 13/360,334, filed Jan. 27, 2012, in the name of Subir Varma, titled "Protocol for Allocating Upstream Slots Over a Link in a Point-to-Multipoint Communication System", now U.S. Pat. No. 8,565,256 which is a continuation of U.S. patent application Ser. No. 11/703,065, filed Feb. 6, 2007, in the name of Subir Varma, titled "Protocol for Allocating Upstream Slots Over a Link in a Point-to-Multipoint Communication System", now U.S. Pat. No. 8,274,991 which is a continuation of U.S. patent application Ser. No. 09/689,243, filed Oct. 11, 2000, in the name of Subir Varma, titled "Protocol for Allocating Upstream Slots Over a Link in a Point-to-Multipoint Communication System" now U.S. Pat. No. 7,173,921, all of which are hereby incorporated by reference as if fully set forth herein.

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to point-to-multipoint communication; in particular, the invention relates to control of contention for data slots by customer premises equipment in a wireless point-to-multipoint communication system.

DESCRIPTION OF THE RELATED ART

In a point-to-multipoint network, plural customer provided equipment (CPEs) communicate bidirectionally with a base station controller (BSC) in a cell. Several CPEs can share a single channel for communicating with the BSC. The CPEs and the BSC use time division duplexing (TDD) to facilitate the bidirectional aspect of the communication. The CPEs and the BSC use time division multiple access (TDMA) to facilitate sharing of a channel among plural CPEs.

In TDMA, the BSC grants data slots to the CPEs. Because multiple CPEs share a limited number of data slots, the CPEs and the BSC must negotiate data slot assignments through a process called contention.

In contention, CPEs that have upstream data to send to the BSC first send a short request (REQ) message to the BSC. The BSC responds with a grant of a data slot for use by the CPE.

Problems can arise in contention. First, two CPEs might simultaneously try to use a single request slot to request data slots. This situation is called collision. When collisions occur, neither CPE's request message successfully reaches the BSC. Second, if many request slots are defined so as to reduce a number of collisions and so as to facilitate requests by a large number of CPEs, too much of available bandwidth can be used up by contention traffic. As a result, data throughput can be unacceptably decreased.

One technique used in the prior art to reduce contention traffic is called piggybacking. In piggybacking, a CPE first requests a data slot. When the data slot is granted by the BSC, the CPE sends data packets upstream. The CPE attaches a size of its current data backlog to a header for one of the data packets. As a result, whenever the backlog is non-zero, the BSC knows to grant a data slot to the CPE without the CPE having to send a REQ message. Thus, contention traffic is reduced.

Unfortunately, piggybacking is only effective if upstream traffic from the CPE is of the bursty type, so that the CPE needs to make only one contention request per burst. However, some important traffic sources are non-bursty. Examples of non-bursty traffic include traffic generated by online games and voice sources. Even ordinary Internet traffic running over TCP becomes non-bursty when a communication link is in heavy traffic. In the presence of non-bursty traffic, the piggyback scheme breaks down, and an excessive number of contention requests are sent upstream.

SUMMARY OF THE INVENTION

In view of the foregoing, further reducing contention traffic is desirable, especially for non-bursty traffic. The invention addresses this need by using a new state machine to control a contention state for a communication link between a base station controller and customer premises equipment in point-to-multipoint communication. According to the invention, the state machine includes a grant pending absent state in which the customer premises equipment is polled with a unicast request slot. During the grant pending absent state, the customer premises equipment sends no upstream data to the base station controller but can use the unicast request slot to request a data slot for sending upstream data to the base station controller.

By virtue of the grant pending absent state, the customer premises equipment can request a data slot without entering into contention and generating excess contention traffic. After a suitable delay without more data being received to send upstream, the state machine can exit the grant pending absent state. This delay preferably is long enough for receipt of new non-bursty data for a communication, for example 50 ms.

The state machine preferably also includes an idle state in which the customer premises equipment awaits arrival of data packets to send as upstream data to the base station controller, a deferring state in which the customer premises equipment requests grant of a data slot for sending upstream traffic to the base station controller and if necessary defers contending for the data slot so as to avoid collisions with other customer premises equipment, and a grant pending state in which the customer premises equipment awaits and receives grant of the data slot for sending upstream data to the base station controller and sends upstream data to the base station controller after grant of the data slot.

In a preferred embodiment of the invention, the customer premises equipment uses piggybacking to request grant of a next data slot while sending upstream data to the base station controller. Use of piggybacking along with the grant pending absent state has been found to decrease drastically contention traffic.

Preferably, the state machine enters the deferring state upon arrival of data packets to send as upstream data to the base station controller. In the preferred embodiment, the state machine enters the grant pending state after the deferring state, returns to the deferring state if a collision occurs, and remains in the grant pending state when sending upstream data to the base station controller with piggybacking. The state machine preferably enters the grant pending absent state after the customer premises equipment has sent upstream data to the base station controller in the grant pending state.

The state machine according to the invention preferably also includes an unsolicited grant pending state in which the customer premises equipment receives grant of the data slot for sending upstream data to the base station controller and sends upstream data to the base station controller after grant of the data slot, without having requested the data slot. The state machine preferably further includes an unsolicited grant pending absent state in which the customer premises equipment is polled with the unicast request slot. During the unsolicited grant pending absent state, the customer premises equipment sends no upstream data to the base station controller but can use the unicast request slot to request the data slot for sending upstream data to the base station controller. Preferably, the state machine enters the unsolicited grant pending absent state after the customer premises equipment has sent upstream data to the base station controller in the unsolicited grant pending state.

The invention can be embodied in a method for controlling communication using the state machine described above, as well as in software and/or hardware such as a base station controller and/or customer premises equipment that implements the method, and in various other embodiments.

This brief summary has been provided so that the nature of the invention may be understood quickly. A more complete understanding of the invention may be obtained by reference to the following description of the preferred embodiments thereof in connection with the attached drawings.

DESCRIPTION OF THE PREFERRED EMBODIMENT

Related Applications

Figure 1:
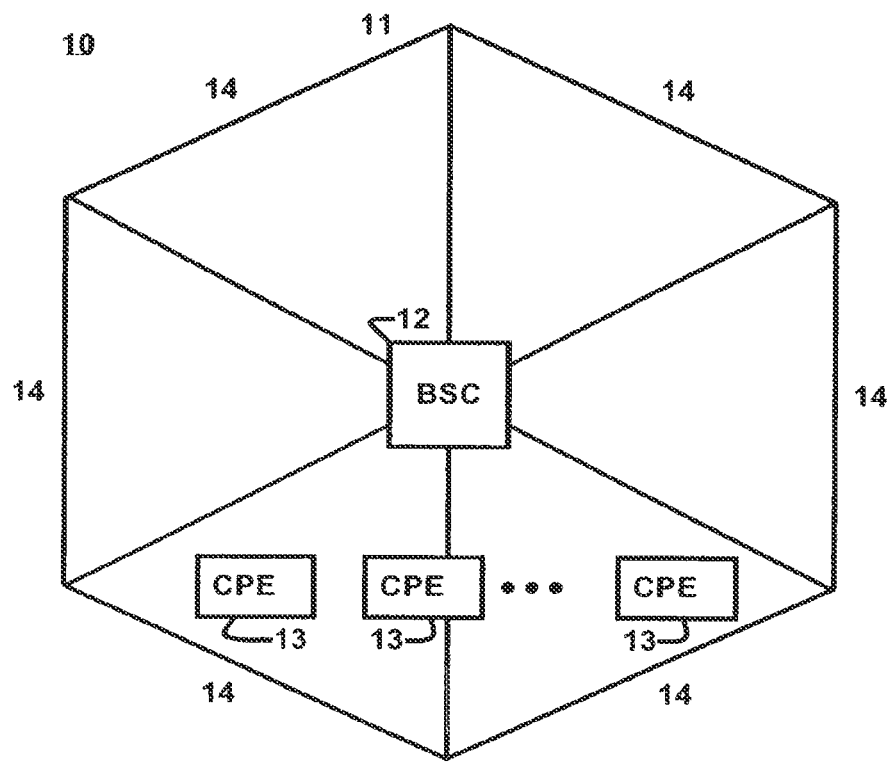
FIG. 1 is a block diagram of a wireless communication system according to the invention in which a base station controller communicates with one or more customer premises equipment according to the invention.

Inventions described herein can be used in conjunction with inventions described in the following documents. [0023] U.S. patent application Ser. No. 09/475,642, Express Mail Mailing No. EL524780018US, filed Dec. 30, 1999 in the names of Reza Majidi-Ahy, Subir Varma, Khuong Ngo, Jean Fuentes and Paul Trong, titled "Adaptive Link Layer for Point to Multipoint Communication System." [0024] U.S. patent application Ser. No. 09/475,716, Express Mail Mailing No. EL524780021US, filed Dec. 30, 1999 in the names of Reza Majidi-Ahy, Joseph Hakim, and Subir Varma, titled "Integrated Self-Optimizing Multi-Parameter and Multi-Variable Point to Multipoint Communication System." [0025] U.S. patent application Ser. No. 09/540,674, Express Mail Mailing No. EL524781512US, filed Mar. 31, 2000, in the name of Reza Majidi-Ahy, titled "Robust Topology Wireless Communication Using Broadband Access Points." [0026] U.S. patent application Ser. No. 09/604,784, Express Mail Mailing No. EL524781225US, filed Jun. 26, 2000 in the name of Reza Majidi-Ahy, titled "High-Capacity Scalable Integrated Wireless Backhaul for Broadband Access Networks." and [0027] U.S. patent application Ser. No. 09/475,716, Express Mail Mailing No. EL524780021 US, filed Dec. 30, 1999 in the names of Reza Majidi-Ahy, Joseph Hakim, and Subir Varma, titled "Integrated, Self-Optimizing, Multi-Parameter/Multi-Variable Point-to-Multipoint Communication System [II]."

Each of these documents is hereby incorporated by reference as if fully set forth herein. This application claims priority of each of these documents. These documents are collectively referred to as the "Incorporated Disclosures."

Lexicography

The following terms refer or relate to aspects of the invention as described below. The descriptions of general meanings of these terms are intended to be illustrative, not limiting.

base station controller (BSC)—in general, a device for performing coordination and control for a wireless communication cell. There is no particular requirement that the base station controller must be a single device; in alternative embodiments, the base station controller can include a portion of a single device, a combination of multiple devices, or some hybrid thereof.

communication link—in general, an element for sending information from a sender to a recipient. Although in a preferred embodiment the communication links referred to are generally wireless line of sight point to point communication links, there is no particular requirement that they are so restricted.

customer premises equipment (CPE)—in general, a device for performing communication processes and tasks at a customer location, and operating in conjunction with the base station controller within a wireless communication cell. There is no particular requirement that the customer premises equipment must be a single device; in alternative embodiments, the customer premises equipment can include a portion of a single device, a combination of multiple devices, or some hybrid thereof.

As noted above, these descriptions of general meanings of these terms are not intended to be limiting, only illustrative. Other and further applications of the invention, including extensions of these terms and concepts, would be clear to those of ordinary skill in the art after perusing this application. These other and further applications are part of the scope and spirit of the invention, and would be clear to those of ordinary skill in the art, without further invention or undue experimentation.

System Context

The context of the invention is similar to that of the Incorporated Disclosures.

A system using point-to-multipoint communication in a wireless communication system operates as part of a system in which devices coupled to a network (such as a computer network) send messages, route and switch messages, and receive messages. In a preferred embodiment, devices coupled to (and integrated with) the network send, route, and receive these messages as sequences of packets, each of which has a header including delivery information and a payload including data. In a preferred embodiment, packet format conforms to the OSI model, in which an application protocol (layer 5, such as FTP) uses a transport protocol (layer 4, such as TCP), which uses a network protocol (layer 3, such as IP), which uses a media access control (MAC) protocol (layer 2), which uses a physical transport technique (layer 1).

System Elements

FIG. 1 is a block diagram of a wireless communication system according to the invention in which a base station controller communicates with one or more customer premises equipment according to the invention.

System 10 includes wireless communication cell 11 (or a portion thereof), base station controller (BSC) 12, and one or more customer premises equipment (CPE) 13.

Wireless communication cell 11 preferably includes a generally hexagon-shaped region of local surface area, such as might be found in a metropolitan region. Use of generally hexagon-shaped regions is known in the art of wireless communication because hexagonal regions are able to tile a local region with substantially no gaps. Although in a preferred embodiment wireless communication cell 11 includes a generally hexagon-shaped region, no particular requirement exists for using that particular shape; in alternative embodiments, another shape or tiling of the local surface area may be useful.

In FIG. 1, a portion of cell 11 includes a generally triangular-shaped region of local surface area, herein called a "sector." Sectors 14 preferably are disposed so that a set of six sectors 14 combine to form single cell 11. Thus, BSC 12 preferably is disposed at or near one corner of one of sectors 14, while CPEs 13 are disposed within the sectors.

Although the invention is primarily described with regard to interactions that occur between BSC 12 and a single CPE 13 in a single sector 14, substantial applications of the invention exist for interactions across multiple sectors within a cell, and to interaction across sectors in multiple cells. Substantial applications of the invention with regard to multiple sectors, both within single cell and among multiple cells, would be clear to those skilled in the art of wireless communication after perusal of this application, and would not require undue experimentation or further invention.

BSC 12 preferably includes a processor, program and data memory, mass storage, and one or more antennas for sending or receiving information using wireless communication techniques.

Similar to BSC 12, each CPE 13 preferably includes a processor, program and data memory, mass storage, and one or more antennas for sending or receiving information using wireless communication techniques.

In system 10, plural CPEs 13 communicate bidirectionally with BSC 12. Several CPEs 13 can share a single channel for communicating with BSC 12. BSC 12 and CPEs 13 preferably use time division duplexing (TDD) to facilitate the bidirectional aspect of the communication. BSC 12 and CPEs 13 preferably use time division multiple access (TDMA) to facilitate sharing of a channel among plural CPEs 13.

In TDMA, BSC 12 grants data slots to CPEs 13. Because multiple CPEs 13 share a limited number of data slots, CPEs 13 and BSC 12 must negotiate data slot assignments through a process called contention.

In contention, CPEs 13 that have upstream data to send to BSC 12 first send a short request (REQ) message to BSC 12. The BSC responds with a grant of a data slot for use by the CPE.

Problems can arise in contention. Plural CPEs 13 might simultaneously try to use a single request slot to request data slots. This situation is called collision. When collisions occur, none of the CPE's request messages successfully reach BSC 12. Those CPEs 13 have to re-send their REQ messages. In order to try to allow REQ traffic to clear, CPEs 13 according to the invention can defer re-sending REQ messages for some period of time when collisions occur.

If many request slots are defined so as to reduce a number of collisions and so as to facilitate requests by a large number of CPEs 13, or if too many REQ messages have to be re-sent, too much of available bandwidth can be used up by contention traffic. As a result, data throughput can be unacceptably decreased.

One technique used in the prior art to reduce contention traffic is called piggybacking. In piggybacking, CPE 13 first requests a data slot. When the data slot is granted by BSC 12, CPE 13 sends data packets upstream. CPE 13 attaches a size of its current data backlog to a header for one of the data packets. As a result, whenever the backlog is non-zero, BSC 12 knows to grant a data slot to CPE 13 without CPE 13 having to send a REQ message. Thus, contention traffic is reduced.

Unfortunately, piggybacking is only effective if upstream traffic from CPE 13 is of the bursty type, so that CPE 13 needs to make only one contention request per burst. However, some important traffic sources are non-bursty. Examples of non-bursty traffic include traffic generated by online games and voice sources. Even ordinary Internet traffic running over TCP becomes non-bursty when a communication link is in heavy traffic. In the presence of non-bursty traffic, the piggyback scheme breaks down, and an excessive number of contention requests are sent upstream.

The invention attempts to reduce contention traffic by using a new state machine to control a contention state for a communication link between a base station controller and customer premises equipment in point-to-multipoint communication. The state can be controlled by the CPE, the BSC, or both.

Figure 2:
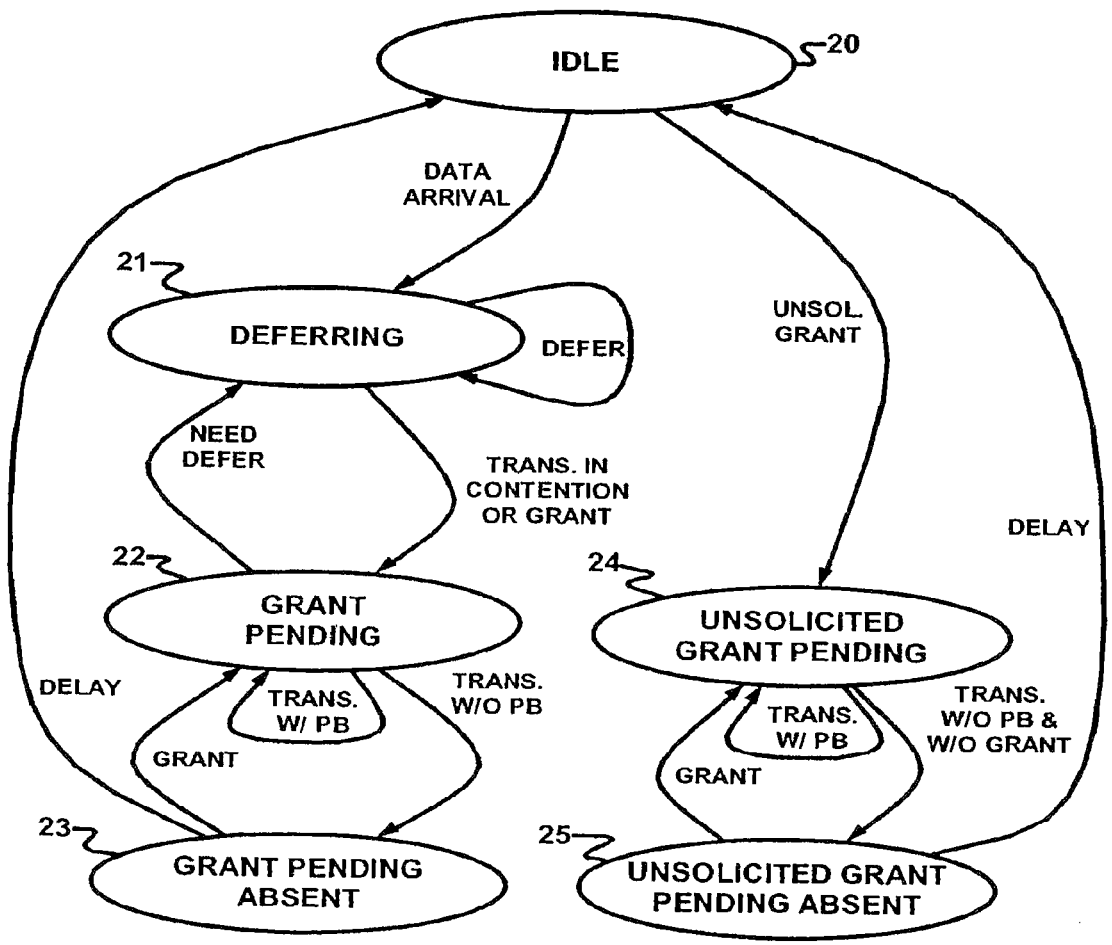
FIG. 2 is a flow chart of a state machine according to the invention.

FIG. 2 is a flow chart of a state machine according to the invention.

Briefly, according to the invention, the state machine includes a grant pending absent state in which the customer premises equipment is polled with a unicast request slot. During the grant pending absent state, the customer premises equipment sends no upstream data to the base station controller but can use the unicast request slot to request a data slot for sending upstream data to the base station controller.

By virtue of the grant pending absent state, the customer premises equipment can request a data slot without entering into contention and generating excess contention traffic. After a suitable delay without more data being received to send upstream, the state machine can exit the grant pending absent state. This delay preferably is long enough for receipt of new non-bursty data for a communication, for example 50 ms.

In more detail, FIG. 2 shows a state machine that includes idle state 20, deferring state 21, grant pending state 22, grant pending absent state 23, unsolicited grant pending state 24, and unsolicited grant pending absent state 25. While the particular states shown in FIG. 2 are representative of a preferred embodiment of the invention, the invention also can utilize state machines that do not include all of these states and/or that include additional states.

Idle state 20 is a waiting state in which the customer premises equipment awaits arrival of data packets to send as upstream data to the base station controller.

Upon arrival of data to be sent as upstream data, the state machine transitions to deferring state 21. The state machine also can transition to unsolicited grant pending state 24 upon receipt of an unsolicited grant of a data slot from BSC 24, as discussed below.

In deferring state 21, CPE 13 sends a REQ message to BSC 12. The state machine then transitions to grant pending state 22. However, if no grant is received from BSC 12 in grant pending state 22 before a timeout, the state machine returns to deferring state 21, as discussed below.

One possible reason for non-receipt of a grant is a collision with another CPE 13. Thus, deferral is needed, and CPE 13 defers sending a new REQ message for a period of time. The CPE then sends the new REQ message. In a preferred embodiment, if another collision occurs, CPE 13 again defers sending another REQ message. This process preferably continues until the REQ messages gets through to BSC 12 (as evidenced by receipt of a grant) or until an error is generated (not shown).

Preferably, each time CPE 13 defers sending a REQ message, the period of deferral roughly doubles, with a random factor included to try to avoid deferring in synch with another CPE. Thus, in deferring state 21, CPE 13 defers contending for a data slot so as to avoid collisions with other customer premises equipment.

In grant pending state 22, CPE 13 awaits and receives grant of the data slot for sending upstream data to the base station controller and sends upstream data to the base station controller after grant of the data slot. However, if a grant is not received before a timeout, the CPE concludes that a collision or some other error has occurred, and the state machine returns to deferring state 21.

Preferably, in grant pending state 22, CPE 13 uses piggybacking to request grant of a next data slot while sending upstream data to BSC 12. When CPE 13 sends the last data in its backlog, that data preferably is sent without piggybacking. The state machine then transitions to grant pending absent state 23 according to the invention.

During grant pending absent state 23, CPE 13 sends no upstream data to BSC 12. No grant is pending because piggybacking was not used in the previous transmission of data to BSC 12 (hence the name of the state). Rather, CPE 13 is periodically (e.g., every 10 ms) polled by BSC 12 with a unicast request slot. CPE 13 can use this unicast request slot to request a data slot for sending upstream data to the base station controller. Thus, if more data is received by is CPE 13 to send upstream to BSC 12, CPE 13 can request a data slot without going through contention, thereby reducing contention traffic.

In some circumstances, the reduction in contention traffic can be drastic, for example by an order of magnitude. Of course, the invention is not limited to such circumstances and is not limited to such drastic reductions in contention traffic.

Upon grant of a data slot for sending new data to BSC 12, CPE 13 returns to grant pending state 22.

If no new data is received by CPE 13 before a timeout in grant pending absent state 23, the state machine returns to idle state 20. A timeout of 50 ms has been found to work well.

In some circumstances, BSC 12 can grant a data slot to CPE 13 without the CPE having requested the data slot. For example, if the communication between BSC 12 and CPE 13 is a voice communication, BSC 12 can predict that CPE 13 will need data slots. BSC 12 can grant those data slots to CPE 13 without CPE 13 having to request them. Such a grant is an unsolicited grant.

Accordingly, the preferred embodiment of the state machine according to the invention also includes unsolicited grant pending state 24 and unsolicited grant pending absent state 25. These states correspond to grant pending state 22 and grant pending absent state 23, respectively, with the exception that they are entered when an unsolicited grant occurs.

Thus, in unsolicited grant pending state 24, CPE 13 receives grant of the data slot for sending upstream data to the base station controller and sends upstream data to the base station controller after grant of the data slot, without having requested the data slot.

In unsolicited grant pending absent state 25, CPE 13 is polled with the unicast request slot. During unsolicited grant pending absent state 25, CPE 13 sends no upstream data to BSC 12 but can use the unicast request slot to request the data slot for sending upstream data to BSC 12. The state machine enters unsolicited grant pending absent state 25 after CPE 12 has sent upstream data to BSC 12 in unsolicited grant pending state 24.

Pseudo-code for implementing the preferred embodiment of the invention substantially as discussed above is included in a technical appendix to this application.

Alternative Embodiments

The invention can be embodied in a method for controlling communication using the state machine described above, as well as in software and/or hardware such as a BSC and/or a CPE that implements the method, and in various other embodiments.

In the preceding description, a preferred embodiment of the invention is described with regard to preferred process steps and data structures. However, those skilled in the art would recognize, after perusal of this application, that embodiments of the invention may be implemented using one or more general purpose processors or special purpose processors adapted to particular process steps and data structures operating under program control, that such process steps and data structures can be embodied as information stored in or transmitted to and from memories (e.g., fixed memories such as DRAMs, SRAMs, hard disks, caches, etc., and removable memories such as floppy disks, CD-ROMs, data tapes, etc.) including instructions executable by such processors (e.g., object code that is directly executable, source code that is executable after compilation, code that is executable through interpretation, etc.), and that implementation of the preferred process steps and data structures described herein using such equipment would not require undue experimentation or further invention.

Furthermore, although preferred embodiments of the invention are disclosed herein, many variations are possible which remain within the content, scope and spirit of the invention, and these variations would become clear to those skilled in the art after perusal of this application.

TECHNICAL APPENDIX
Pseudo-code copyright 2000 Aperto Networks, Inc.

4.1 State: Idle TABLE-US-00001 ContentionWindow = 0; Wait for !QueueEmpty; /* The CPE may get an unicast REQ slot in the idle state. */ /* In this case it returns the current reqWin value */ if (unicast REQ SID == mySID) /* Polling case */ { Transmit REQ in reservation; Tx_slot = slot; PrevREQ = NonContREQ; } if (NormalGrantId == mySID) Utilize Normal Grant( ); else if (UnsolicitedGrantId == mySID) { Utilize Unsolicited Grant( ); Go to State Unsolicited Grant Pending; } /* EPDU Arrives */ Enqueue( ); CalculateDefer( ); Go to State Deferring
4.2 State: Deferring TABLE-US-00002 if (UnsolicitedGrantId == mySID) /* Unsolicited Grant Service */ { Utilize Unsolicited Grant( ); Go to State Unsolicited Grant Pending; } else if (NormalGrantId == mySID) Utilize Normal Grant( ); else if (unicast REQ SID == mySID) /* Polling case */ { Transmit REQ in reservation; Tx_slot = slot; Go to Grant Pending; PrevREQ = NonContREQ; } else { for (REQ Transmit Opportunity) /* Contention based REQ transmission */ { if (Defer != 0) Defer = Defer − 1; else /* Defer = 0 */ { if (Number of SIDs in CPE, with Defer = 0 is greater than 1) choose one SID at random; if (my SID chosen) { Transmit REQ in contention; Tx_slot = slot; RTxTime = time_now; PrevREQ = ContREQ; Go to Grant Pending; } } } }
.3 State: Grant Pending TABLE-US-00003 Wait for next MAP; Move ACK pointer as per ACK field in MAP; The next byte to transmit is set as per ACK/NACK flag and Sequence Number in the ACK if (Flush EPDU field set) { Flush HOL EPDU; Go to Idle; } if (unicast REQ SID == mySID) /* Polling case */ { Transmit REQ in reservation; Tx_slot = slot; PrevREQ = NonContREQ; } if (Normal GrantId == mySID) Utilize Normal Grant( ); else if (Unsolicited GrantId == mySID) { Utilize Unsolicited Grant( ); Go to State Unsolicited Grant Pending; } else if (implicit collision indication received) Retry( ); else /* Error Condition: BSC did not give grant that CPE is expecting */ Go to Idle;
4.4 State: Grant Pending Absent TABLE-US-00004 if (First Time Entering State) Count = GrantPendingWait; else --Count; if (unicast REQ SID == mySID) /* Polling case */ { Transmit REQ in reservation; Tx_slot = slot; PrevREQ = NonContREQ; }
4.5 State: Unsolicited Grant Pending TABLE-US-00005 if (unicast REQ SID == mySID) /* Polling case */ { Transmit REQ in reservation; Tx_slot = slot; PrevREQ = NonContREQ; } if (Unsolicited GrantId == mySID) { Utilize Unsolicited Grant( ); Remain in State Unsolicited Grant Pending; } if (Last Unsolicited Grant) Go to state Idle;
4.6 State: Unsolicited Grant Absent TABLE-US-00006 if (First Time Entering State) Count = UnsolicitedGrantPendingWait; else --Count; if (unicast REQ SID == mySID) /* Polling case */ { Transmit REQ in reservation; Tx_slot = slot; PrevREQ = NonContREQ; }
4.7 Function: CalculateDefer( ) TABLE-US-00007 if (ContentionWindow < Start) Window = Start; if (ContentionWindow > End) Window = End; Defer = Random[2{ circumflex over ( )}Contention Window];
4.8 Function: Utilize Normal Grant( ) TABLE-US-00008 if (Grant Size == 0) /* Scheduler not able to make grant during this frame */ Go to Grant Pending; else /* Grant Size > 0 */ { while (GrantSID == mySID) /* Multiple Grants in MAP */ { Extract Indicated number of bytes from SID queue; Confirm that these bytes fit in the tick space allocated; piggyback size = RequestWindow; Transmit WPDU with Sequence Number Field set as per MAP and Piggyback field set as above; } if (piggyback size > 0) { Go to Grant Pending; RTxTime = time_now; PrevREQ = NonCOntREQ; } else /* No more bytes left in SID queue */ Go to GrantPendingWait; }
4.9 Function: Utilize Unsolicited Grant( ) TABLE-US-00009 while (GrantSID == mySID) /* Multiple Grants in MAP */ { Extract Indicated number of bytes from SID queue; if (#bytes == 0) Tx only WPDU header; else { Confirm that these bytes fit in the tick space allocated; piggyback size = RequestWindow; Transmit WPDU with Sequence Number Field set as per MAC and Piggyback field set as above; } }
4.10 Function: Retry( ) TABLE-US-00010 Retries = Retries + 1; if (Retries > 16) { Discard HOL EPDU; Go to Idle; } ContentionWindow = ContentionWindow + 1; CalcDefer( ); Go to Deferring;
4.11 Function: Enqueue( ) Enqueue EPDU to tail of queue; Request Window=RequestWIndow+Size of EPDU.

I claim:

1. A wireless communication device that communicates over a communication link with a base station controller (BSC) in a point-to-multipoint wireless cellular communication system, comprising:
a transceiver; and
a processor that operates the wireless communication device to,
transmit a first type message to the BSC in a contention transmission opportunity and await receipt of an upstream data transmission grant from the BSC;
transmit upstream data to the BSC after receiving the upstream data transmission grant;
transmit to the BSC a second type message together with the upstream data, the second type message indicative of a requirement for a subsequent upstream data transmission grant; and
after all upstream data has been transmitted to the BSC, transmit to the BSC a third type message without contention for enabling the wireless communication device to transmit new upstream data subsequently received by the wireless communication device prior to expiry of a timeout; and
the processor further operates the wireless communication device in an idle state awaiting arrival of upstream data to send to the BSC, if no new upstream data is received at the wireless communication device before expiry of the timeout.

2. A wireless communication device as claimed in claim 1, wherein the second type message is transmitted within a header of a packet.

3. A wireless communication device as claimed in claim 1, wherein the processor is capable of increasing a deferral time for transmission of a subsequent first type message on condition that the upstream data transmission grant is not received within the deferral time.

4. A wireless communication device as claimed in claim 1, wherein the first type message is transmitted in contention with messages from other wireless communication devices in the wireless communication system.

5. A wireless communication device as claimed in claim 1, wherein the upstream data transmission grant specifies an upstream transmission resource for transmission of the upstream data to the BSC.

6. A wireless communication device as claimed in claim 5, wherein the second type message is transmitted to the BSC in the upstream transmission resource allocated to the wireless communication device for transmitting the upstream data.

7. A wireless communication device as claimed in claim 5, wherein the processor further operates the transceiver to transmit an additional second type message to the BSC within the upstream transmission resource if there is additional data pending transmission to the BSC.

8. A wireless communication device as claimed in claim 5, wherein the third type message indicates to the BSC that the new upstream data awaits transmission to the BSC.

9. A wireless communication device as claimed in claim 5, wherein the processor further operates the transceiver to transmit only the second type message within the upstream transmission resource, if the upstream transmission resource cannot accommodate both the upstream data and the second type message.

10. A wireless communication device, comprising:
a transceiver having an antenna for transmitting and receiving data to and from a base station controller (BSC);
a processor; and
a memory capable of storing non-transitory computer readable instructions, the instructions, when executed by the processor, causing the transceiver to transmit three types of messages to the BSC unit, including:
a first type message transmitted in a contention transmission opportunity, indicating that the wireless communication device has data pending upstream transmission to the BSC;
a second type message transmitted within an upstream transmission resource allocated to the wireless communication device in response to the first type message;
a third type message transmitted without contention, on condition that all the data pending upstream transmission to the BSC was transmitted within the upstream transmission resource and new upstream data becomes available for transmission to the BSC prior to expiry of a timeout; and
wherein the instructions, when executed by the processor cause the processor to operate the wireless communication device in an idle state awaiting arrival of upstream data to send to the BSC, on condition that no new upstream data becomes available for transmission to the BSC during a period of time after transmission of the data pending upstream transmission to the BSC.

11. A wireless communication device as claimed in claim 10, wherein the instructions, when executed by the processor cause the processor to cease operating in the idle state and transmit a further first type message to the BSC in a contention transmission opportunity on condition that upstream data to be sent to the BSC is received.

12. A wireless communication device as claimed in claim 10, wherein the upstream transmission resource is specified by an upstream data transmission grant received from the BSC.

13. A wireless communication device as claimed in claim 12, wherein the instructions, when executed by the processor, further cause the processor to increase a deferral time for transmission of a subsequent first type message on condition that the upstream data transmission grant is not received within the deferral time.

14. A wireless communication device as claimed in claim 10, wherein the first type message is transmitted in contention with messages from other wireless communication devices.

15. A wireless communication device as claimed in claim 10, wherein the instructions, when executed by the processor, further cause the transceiver to transmit an additional second type message to the BSC within a subsequent upstream transmission resource if there is additional upstream data pending transmission to the BSC.

16. A wireless communication device as claimed in claim 10, wherein the second type message is indicative of an amount of data pending upstream transmission.

17. A wireless communication device as claimed in claim 10, wherein the memory comprises any of fixed memories and removable memories.

18. A wireless communication device operable to communicate with a base station controller (BSC) in a point-to-multipoint wireless cellular communication system, comprising:
a transceiver having an antenna for transmitting and receiving data to and from the BSC;
one or more processors; and
a memory capable of storing non-transitory computer readable instructions, the instructions, when executed by the one or more processors, cause the transceiver to,
transmit a first type message to the BSC in a contention transmission opportunity;
receive an upstream data transmission grant from the BSC unit;
transmit pending data to the BSC within an upstream transmission resource specified by the upstream data transmission grant;
transmit a second type message to the BSC within the upstream transmission resource, the second type message indicative of an amount of data pending upstream transmission;
receive a subsequent upstream data transmission grant from the BSC;
transmit a first additional upstream data pending transmission to the BSC in a specified subsequent upstream transmission resource, specified by the subsequent upstream data transmission grant;
transmit an additional second type message to the BSC within the specified subsequent upstream transmission resource if there is second additional upstream data pending transmission to the BSC unit;
on condition that there is no further second additional upstream data pending transmission to the BSC and new upstream data becomes available for transmission to the BSC prior to expiry of a timeout, transmit a third type message to the BSC without contention, the third type message indicating to the BSC that the new upstream data awaits transmission to the BSC; and
on condition that there is no further second additional upstream data pending transmission to the BSC and no new upstream data becomes available for transmission to the BSC prior to expiry of the timeout, operating in an idle state awaiting arrival of upstream data to send to the BSC.

19. A wireless communication device as claimed in claim 18, wherein the instructions, when executed by the one or more processors, cause the one or more processors to increase a deferral time for transmission of a subsequent first type message, on condition that the upstream data transmission grant is not received within the deferral time.

20. A wireless communication device as claimed in claim 18, wherein the one or more processors include general purpose processors or special purpose processors.

21. A wireless communication device as claimed in claim 5, wherein the processor further operates the wireless communication device to cease operating in the idle state and transmit a further first type message to the BSC in a contention transmission opportunity subsequent to arrival of upstream data to be sent to the BSC.

22. A wireless communication device as claimed in claim 18, wherein the instructions, when executed by the one or more processors, cause the one or more processors to cease operating in the idle state and transmit a further first type message to the BSC in a contention transmission opportunity on condition that upstream data to be sent to the BSC is received.

23. A wireless communication device that communicates over a communication link with a base station controller (BSC) in a point-to-multipoint wireless cellular communication system, comprising:

an antenna means for sending and receiving wireless information; and a processor means for operating the wireless communication device to, transmit a first type message to the BSC in a contention transmission opportunity and await receipt of an upstream data transmission grant from the BSC;

transmit upstream data to the BSC after receiving the upstream data transmission grant;

transmit to the BSC a second type message together with the upstream data, the second type message indicative of a requirement for a subsequent upstream data transmission grant; and after all upstream data has been transmitted to the BSC, transmit to the BSC a third type message without contention for enabling the wireless communication device to transmit new upstream data subsequently received by the wireless communication device prior to expiry of a timeout; and the processor means further for operating the wireless communication device in an idle state awaiting arrival of upstream data to send to the BSC, if no new upstream data is received at the wireless communication device before expiry of the timeout.

* * * * *